Dec. 9, 1941.  E. SCHMID  2,265,197
VALVE GEAR FOR INTERNAL COMBUSTION ENGINES OF THE SLEEVE VALVE TYPE
Filed Nov. 28, 1939  4 Sheets-Sheet 1

Dec. 9, 1941.  E. SCHMID  2,265,197
VALVE GEAR FOR INTERNAL COMBUSTION ENGINES OF THE SLEEVE VALVE TYPE
Filed Nov. 28, 1939  4 Sheets-Sheet 4

Patented Dec. 9, 1941

2,265,197

UNITED STATES PATENT OFFICE 2,265,197

VALVE GEAR FOR INTERNAL COMBUSTION ENGINES OF THE SLEEVE VALVE TYPE

Ernest Schmid, Annecy, France

Application November 28, 1939, Serial No. 306,559
In Germany January 31, 1939

5 Claims. (Cl. 123—75)

Various sleeve-valve control mechanisms for internal combustion engines are known, they have this drawback however that they subject the sleeve valves to distorting stresses which are definitely harmful. This is due to bad distribution and arrangement of the points at which the carrying members act. To the desired reciprocating movement there are superadded undesirable accessory stresses which tend to overturn or distort the sleeve valve.

An improvement of this kind of mechanism consists in operating the sleeve valve by means of carrying members acting on two points situated symmetrically on either side of its longitudinal axis, that is to say on the two extremities of a diameter. The carrying member will be for example an oscillating fork of which the balancing movement makes it however impossible to ensure that the resultant force transmitted constantly coincides with the axis of the sleeve valve. The only advantage is that the said force is maintained in an axial plane lying perpendicularly to the diameter on the extremities of which the fork applies, the force being most of the time directed obliquely and at a periodically variable angle in regard to the longitudinal axis of the sleeve valve, which will for this reason be submitted to stresses increasing its wear, tending to ovalise the cylinder and opposing finally to the use of a thin sleeve valve, split in its entire length, consequently easily deformable.

The only entirely symmetrical disposition hitherto proposed is one in which a sleeve valve of great thickness is used and moves like an annular piston by the action of the exhaust gases of the engine. Obviously this solution is to be applied in the case of thick sleeve valves which are made to fit closely by means of piston rings.

But it is certain that a thin sleeve valve split in its entire length has an invaluable advantage, bringing about the rational solution as far as a lightness never previously attained permits, in obtaining high speeds as its flexibility ensures the most perfect fitting, and it is to be regretted that the gear mechanisms known were constantly unsuited to its use.

The proposed mechanism, utilising for moving the sleeve carrying-members located symmetrically on both sides of the longitudinal axis of the said sleeve, makes it possible to eliminate all stresses tending to wear it away unevenly, distort it, wedge it in or overturn it, and consequently allows the use of a thin sleeve valve (to which said mechanism is however not limited).

According to the invention the carrying members are connected on the sleeve in such a manner that they will not communicate an effort to the said sleeve except in the axial direction in which they are guided and across which the sleeve and said membrs can move together. Thanks to this disposition the resultant propulsive force coincides always with the axis of the sleeve, avoiding every distorting action.

The appended drawings show an embodiment of the present invention given by way of example and applied in the case of a four-stroke cycle combustion engine with a sleeve moved by means of a disposition known as two-eccentric gear system, i. e. comprising two eccentrics of which one works at the speed of the crankshaft and the other at half that speed.

Figure 1:
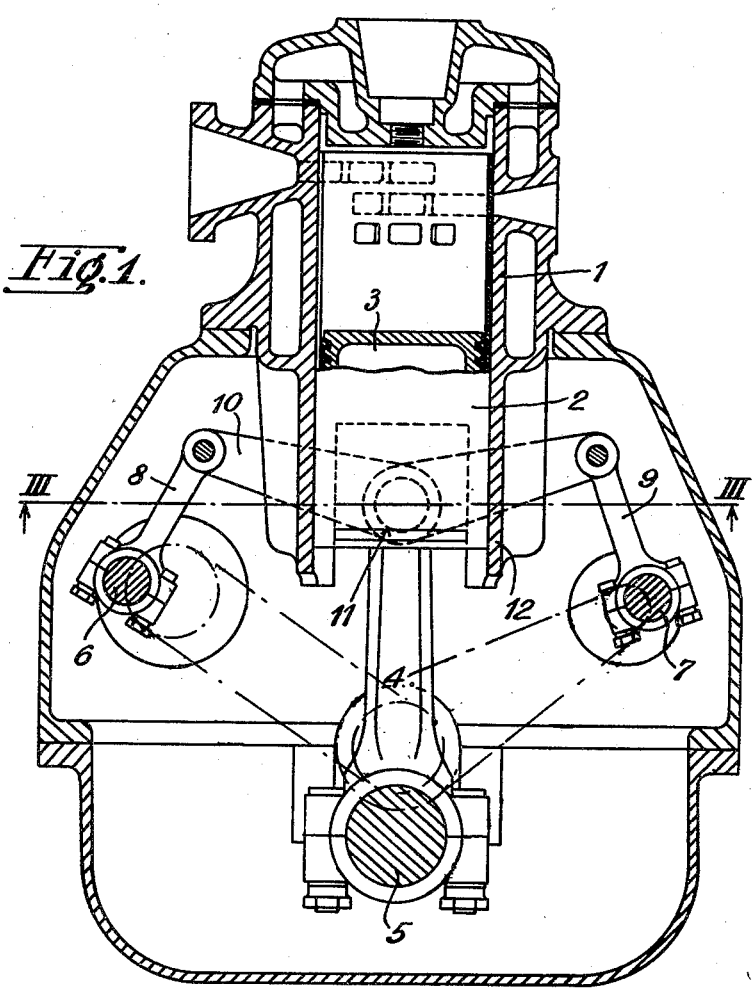
Fig. 1 shows an axial section of the cylinder taken perpendicularly to the crankshaft and to the shafts of the eccentrics controlling the sleeve.
Figure 2:
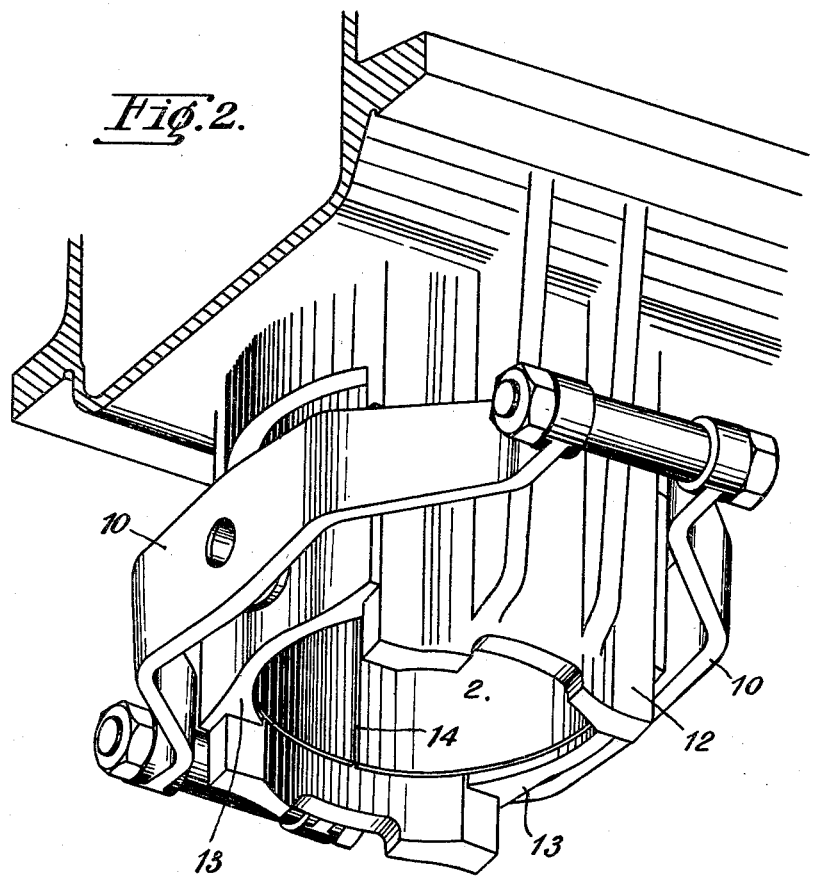
Fig. 2 shows the gearing mechanism in perspective, seen from below.

In the cylinder 1 reciprocate the sleeve 2 and also the piston 3 of which the connecting rod 4 drives the crankshaft 5.

Figure 4:
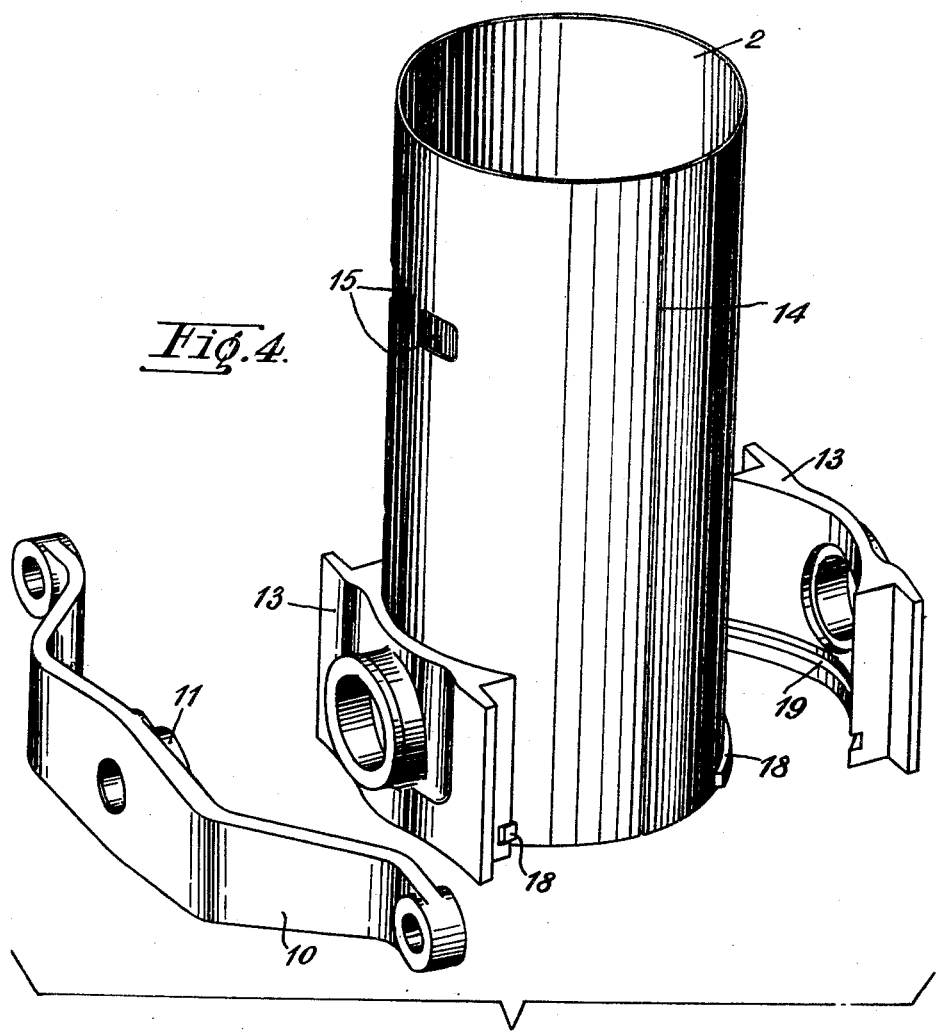
Fig. 4 shows a perspective view of the unmounted sleeve, of the two connecting members provided to move it, and of a coupling link part of the two-eccentric gear system.

On both sides and above the crankshaft are located the eccentrics 6 and 7 of the two-eccentric gear of which the coupling rods 8 and 9 move a rigid frame principally composed of two couplings links 10, of which only one is visible respectively seen in Figs. 1 and 4. Each of these coupling links supports a plug 11 engaging in one of the two coupling members 13 sliding in the slides located between the guides 12 extending through the cylinder in the direction of the crankshaft. These coupling organs constitute sliding blocks.

The two sliding blocks are of such a shape that they partially surround the sleeve 2 without however entering into contact with its external cylindrical surface. This is shown clearly in Fig. 3. In this way the sleeve is only guided by the interior wall of the cylinder against which it lies closely and by the internal surface of the guides 12 made in order to extend the interior surface of the cylinder with which they have been simultaneously bored so as to have an unbroken continuity of surface.

Opposite the sliding blocks 13 symmetrically placed on both sides of the longitudinal axis of the sleeve and simultaneously moved in the axial direction by means of the two coupling links 10 and their plugs 11, the sleeve presents on the lower part projections 18 of rectangular cross section penetrating in grooves 19 of corresponding cross section in the sliding blocks 13. The thickness of these projections measured in radial direction is such that their external cylindrical surface is unable to enter into contact with the bottom of the grooves 19. This disposition, as well as the radial play subsisting between the sliding blocks and the sleeve is intended to avoid all transmission of a non axial effort from the sliding blocks to the sleeve, which they can only carry parallel to the axis once above and once below by means of the contact surfaces provided between the projections and the grooves and lying perpendicularly to the axis of the sleeve. The resultant of the forces moving the sleeve will always coincide with its axis, respectively with the axis of the cylinder.

The frame constituted by the two coupling links 10 and the fastenings screws 20 is, of course, absolutely rigid, and is, moreover, moved by connecting rods 8 and 9 in such a manner that it will absolutely avoid every distorting action and ensure a symmetric movement of the sliding blocks 13.

The sleeve shown is of the thin type, slit at 14 in its entire length, controlling the inlet ports and outlet ports by means of the valve ports 15 and its upper edge.

Figure 3:
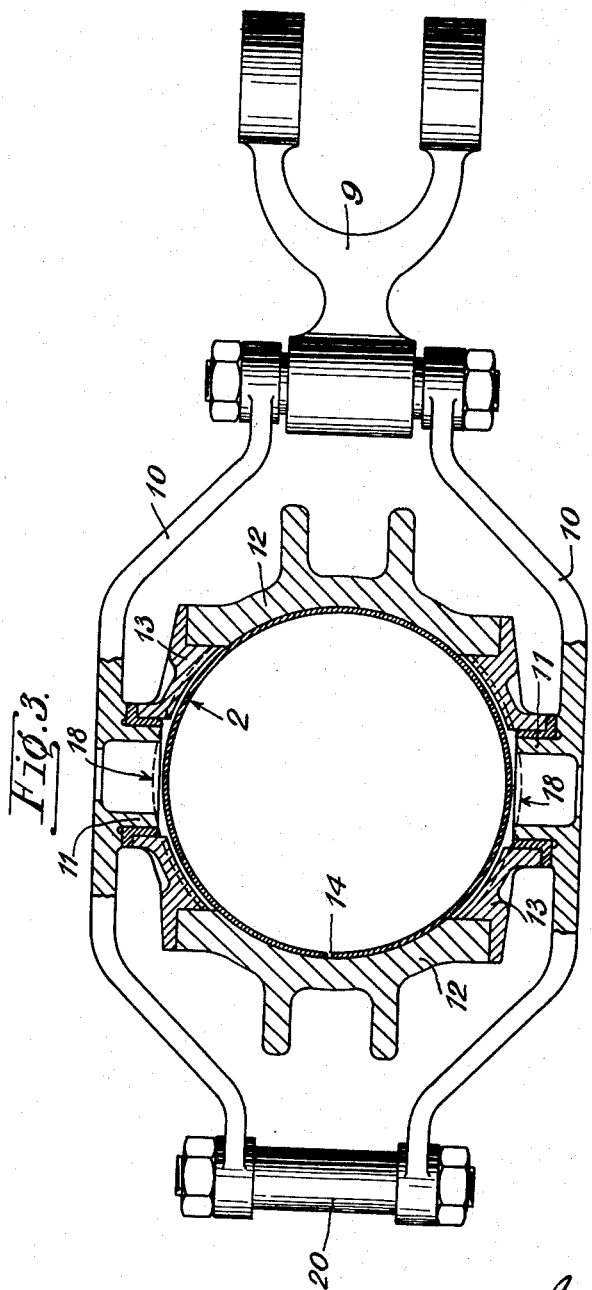
Fig. 3 is a cross section upon the line III—III of Fig. 1.

It must also be remembered that the sleeve lies close against the inner surface of the guides 12 precisely where the wear of the cylinder takes place, i. e. there where the piston presses most. These guides extend the cylinder in an absolutely rigid way, Figs. 1 and 3 showing clearly the disposition of the supporting ribs intended to strengthen them.

The gear mechanism according to the invention can of course be utilised with any other system of controlling the sleeve. It is sufficient for the said controlling system to have two connecting members symmetrically located on both sides of the longitudinal axis of the sleeve.

The mechanism according to the invention does not wear on account of its disposition in the lower part of the engine where the crankshaft projects the oil and insures a perfect splash lubrication.

Finally, the use of the mechanism according to the invention is, of course, not confined to the control of the sleeve of internal combustion engines of the four stroke cycle type; it can be applied wherever there is a sleeve valve to be controlled.

What I claim is:

1. A valve gear for internal combustion engines with sleeve valves operated by means of sliding blocks symmetrically located on both sides of the longitudinal sleeve axis and presenting with the sleeve only surfaces of contact perpendicular to its axis and forming with regard to the sleeve part of external projections of it, said sliding blocks sliding in guides extending under the cylinder in direction of the crankshaft between projections of which the internal side has an unbroken continuity of surfaces with the inner surface of the cylinder.

2. A valve gear for internal combustion engines with sleeve valves operated by means of sliding blocks operated by plugs of a rigid frame moved by means of the control system and symmetrically located on both sides of the longitudinal sleeve axis, said sliding blocks presenting with the sleeve only surfaces of contact perpendicular to its axis and forming with regard to the sleeve part of external projections of it and sliding in guides extending under the cylinder in direction of the crankshaft between projections of which the internal side has an unbroken continuity of surface with the inner surface of the cylinder.

3. Mechanism for operating a sleeve valve in an internal combustion engine, said valve provided with slide blocks symmetrically located on both sides of the valve, said blocks being connected to the adjacent parts for entrainment only in axial direction, said slide blocks being guided directly adjacent the surface of the sleeve valve parallel to the longitudinal cylinder axis in such manner that when they are subjected to obliquely directed forces originated from other parts of the drive their direction of movement is parallel only to those components of these forces which are parallel to the cylinder axis, and means for reciprocating said slide blocks.

4. A mechanism as set forth in claim 3 in which guides are provided for said slide blocks comprising forked shaped extensions of the cylinder toward the crank shaft, the interior opposite surfaces constituting extensions of the interior surfaces of the cylinder.

5. A mechanism as set forth in claim 3 in which said means for reciprocating said slide blocks includes two eccentrics, a rigid frame operated by said eccentrics and plugs on said frame.

ERNEST SCHMID.